(No Model.) 2 Sheets—Sheet 1.
C. F. PIKE.
PROCESS OF AND APPARATUS FOR SEPARATING PRECIOUS METALS FROM MAGNETIC ORES.
No. 581,034. Patented Apr. 20, 1897.
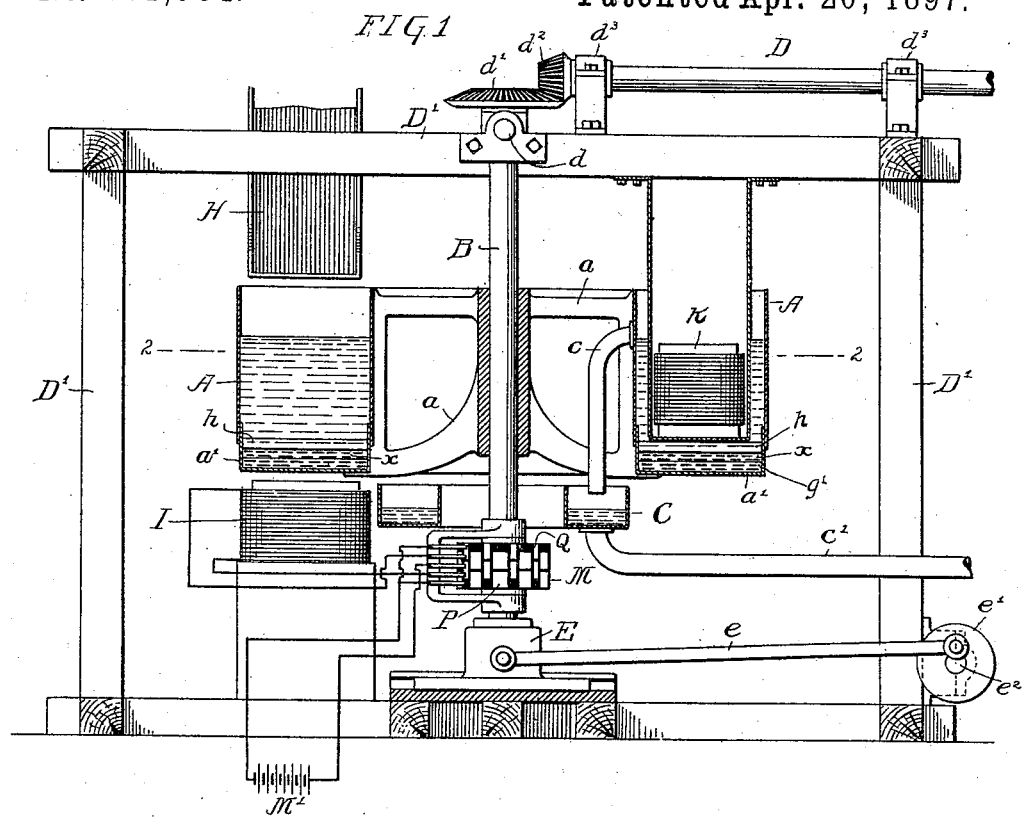
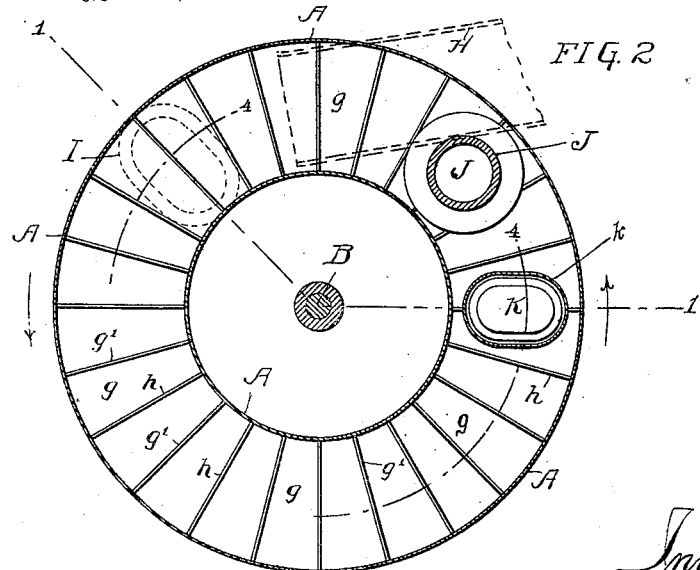
Witnesses:
Jno E Parker
Thomas Killian
Inventor:
Charles F. Pike,
by his Attorney,
Wm. A. Pike (No Model.) 2 Sheets—Sheet 2.
C. F. PIKE.
PROCESS OF AND APPARATUS FOR SEPARATING PRECIOUS METALS FROM MAGNETIC ORES.
No. 581,034. Patented Apr. 20, 1897.
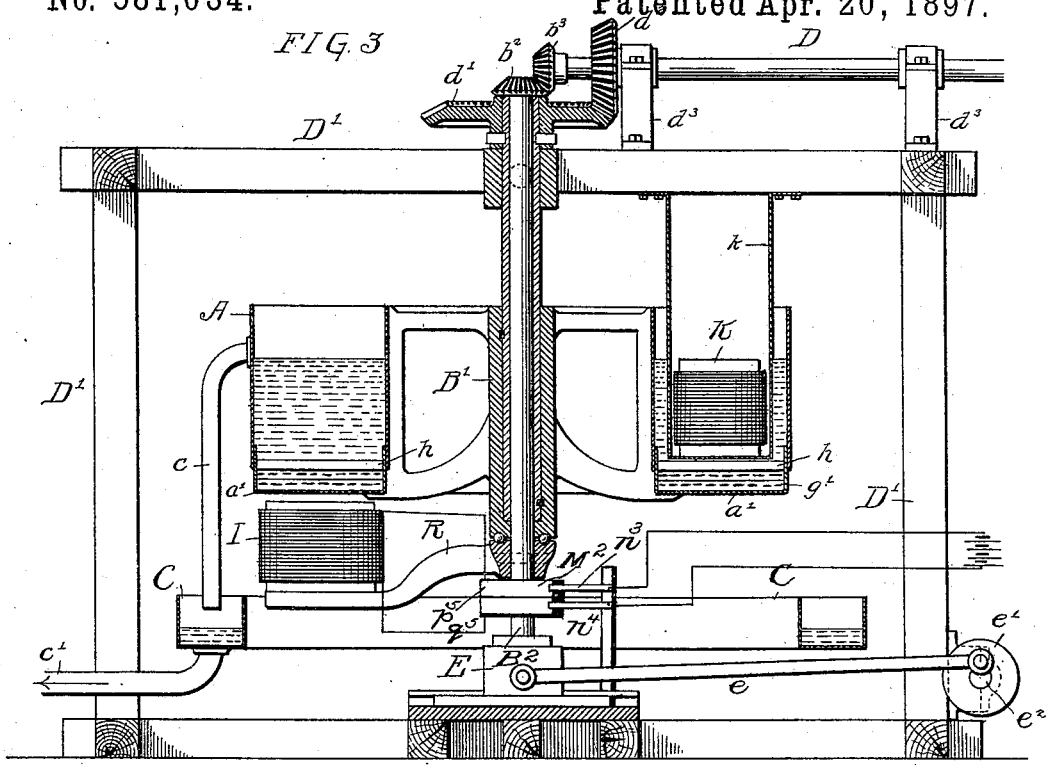
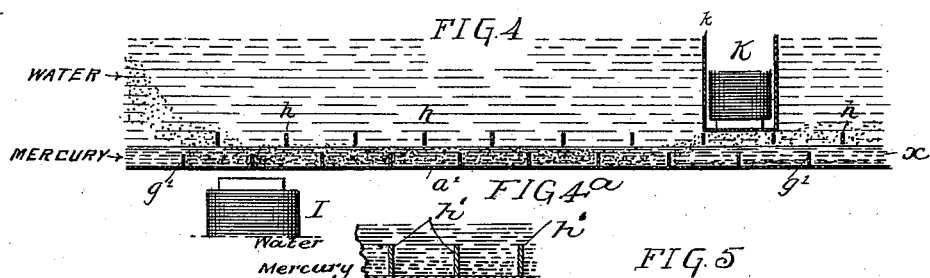
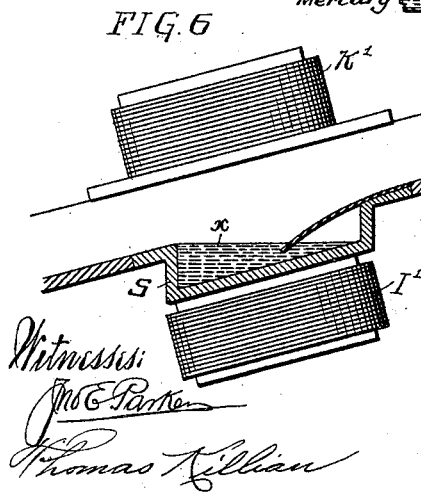
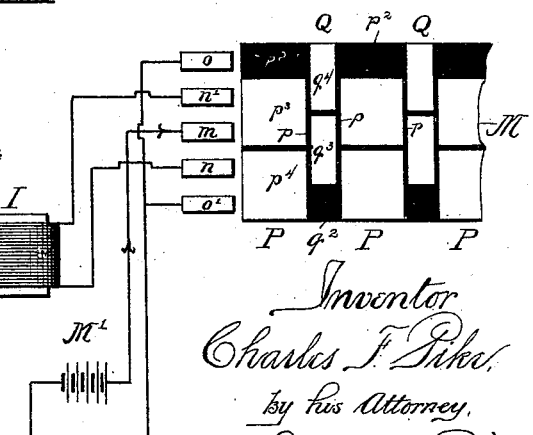
Witnesses:
Jno. E. Parker
Thomas Killian
Inventor
Charles F. Pike,
by his Attorney,
Wm. A. Pike.

UNITED STATES PATENT OFFICE.

CHARLES F. PIKE, OF PHILADELPHIA, PENNSYLVANIA.

PROCESS OF AND APPARATUS FOR SEPARATING PRECIOUS METALS FROM MAGNETIC ORES.

SPECIFICATION forming part of Letters Patent No. 581,034, dated April 20, 1897.

Application filed October 21, 1896. Serial No. 609,613. (No model.)

*To all whom it may concern:*

Be it known that I, CHARLES F. PIKE, a citizen of the United States, and a resident of the city of Philadelphia, State of Pennsylvania, have invented a certain new and Improved Process of and Apparatus for Separating Precious Metals from Magnetic Ores, of which the following is a full, clear, and exact description, reference being had to the accompanying drawings, forming part of this specification.

My invention relates to certain improvements in the art or process of separating gold from gold-bearing ores, and has especial reference to the separation of the metal from what is known as "black sand," a comminuted magnetic ore in which fine particles of gold are loosely held.

It has been proposed to separate the gold from the magnetic sand by the use of permanent or electro magnets, but such processes have not hitherto been effective, for the reason that when the black sand is brought into a magnetic field and subjected to a strong magnetic force each particle of the sand becomes in effect a magnet, each being attracted to the other, and as they are drawn together the fine gold is caught and held between them.

In the separation of the metal by the use of mercury it is found that owing to the lighter metallic impurities which exist in the ore the surface of the mercury becomes coated and prevents its amalgamation with the gold.

In carrying out my invention I propose to overcome these difficulties by utilizing a magnet or magnets to attract and draw the magnetic ore below the surface of the mercury, the first effect of the use of the magnet being to draw the particles of sand with the contained gold below the upper surface of the mercury. After the ore and metal are below the surface of the mercury the magnet is demagnetized, or a change in its polarity is effected, so that the sand will be demagnetized, and as the particles are then no longer held by magnetic force they gradually rise through the bed of mercury, being of less specific gravity, and as they rise are free to separate and permit the amalgamation of the metal and the mercury. This effect is produced when the magnet is demagnetized, but the separation of the particles is comparatively slow, as they are bunched together and pressed upon on all sides by the mercury, and in order to expedite the separation of the particles the polarity of the magnet is preferably changed.

When first placed in a magnetic field, each of the particles of sand will in effect become a small magnet with a north and a south pole, and if the north pole of the operating-magnet be turned toward them the south pole of each of the minute magnets will seek the north pole of the operating-magnet, so that if the operating-magnet has its polarity changed for the moment there will be a repellant action caused by the turning of the grains of sand to present their north pole to the south pole of the operating-magnet. This repellant action is slight, but is sufficient to separate the grains of sand to an extent which will enable them to more readily comply with the law of gravity and separately rise to the surface of the mercury, the latter filling the spaces between the grains and amalgamating with the loose particles of gold.

In the further operation of the process the black sand after being freed from its gold is subjected to the action of a permanent or electro magnet to raise it from the surface of the mercury, so that it may be more readily discharged, the magnet operating also to thoroughly cleanse the mercury of any particles of the sand which may be held below the surface of the mercury.

In the accompanying drawings, Figure 1 is a transverse sectional elevation on the line 1 1, Fig. 2, of a separator constructed in accordance with my invention and adapted to carry my improved process into effect. Fig. 2 is a sectional plan view of the same on the line 2 2, Fig. 1. Fig. 3 is a view similar to Fig. 1, illustrating a modified construction of apparatus. Fig. 4 is a sectional diagram on the line 4 4, Fig. 2, illustrating the operation of the magnets. Fig. 4ª is a similar view illustrating a slight modification in the structure of the revolving trough. Fig. 5 is a diagram illustrating the electrical connections for effecting the change in polarity of the electromagnet, and Fig. 6 is a sectional elevation of a riffle arranged and constructed for the carrying out of my improved process.

Referring to Figs. 1 and 2, A represents a circular trough formed of any suitable material and provided with radial supporting-arms $a$, which serve to connect it to a rotating shaft B, which supports and rotates the trough. The bottom of trough A is provided with a copper or other amalgamating surface $a'$, on which is placed a layer of mercury $x$, and on top of the mercury is a body of water, the level of which is governed by an overflow-pipe $c$, leading into a stationary overflow-trough C, from which leads a drain-pipe $c'$.

The upper end of the shaft B is mounted in a suitable rocking bearing $d$ and is provided with a bevel-gear $d'$, with which intermeshes a bevel-pinion $d^2$ on a power-shaft D, held in suitable bearings $d^3$ on the top of the supporting-frame D' of the apparatus. The lower end of the shaft B is supported in a step-bearing E, connected by an arm or arms $e$ to a crank wheel or disk $e'$ on a shaft $e^2$, the rotation of the shaft effecting the reciprocation of the step-bearing E and effecting the vibration of the trough A in such manner as to keep its contents in constant motion.

The lower portion of the trough A is divided into a series of pockets $g$ by means of a series of preferably radial division-plates $g'$ for a purpose to be hereinafter set forth, and above these, preferably at a point above the level of the mercury, is a second series of plates $h$, as illustrated in Fig. 4, or the plates $g'$ and $h$ may be integral and arranged in the same vertical plane, if desired, as shown at $h'$ in Fig. 4$^a$.

At a point above the top of the trough A is a feed-chute H, by means of which the trough is supplied with the material to be acted upon, and at a point just in advance of the feed-trough, but below the bottom thereof, is an electromagnet I. The discharge-chute or suction-pipe J is arranged near the feed-chute, and in advance of the feed-chute a permanent or electro magnet K is arranged within the trough.

The construction of the feed-chute and suction discharge-pipe may be similar to that shown in Letters Patent No. 529,047, granted to me on November 13, 1894, or of any other suitable construction, the function of the feed-chute being to supply the necessary quantity of ore or magnetic sand and the function of the discharge being to remove by suction the material after the gold has been extracted therefrom.

On the shaft B is secured a drum M, made up of a series of metallic plates separated by insulating material, as more clearly illustrated in the diagram Fig. 5, and adjacent to the drum are a series of stationary contact-brushes $m$, $n$, $n'$, $o$, and $o'$, all of which are at all times in contact with the surface of the drum and which are connected by suitable wires to an electric battery M' or other source of electrical supply and to the coils of the electromagnet I. The arrangement is such that as the drum M is rotated with the shaft and with the trough A the electromagnet will be first energized, then demagnetized, and then its polarity be momentarily changed.

Referring to Fig. 5, $m$ represents the contact-brush connected to the pole of the battery M', from which the current flows, $n$ and $n'$ the contact-brushes connected to the opposite ends of the helical coil which forms the electromagnet I, and $o$ $o'$ are the contact-brushes leading the current through the return-wires of the battery.

The surface of the drum is divided into a number of vertical rows P and Q by non-conducting material $p$, the width of the rows P being much greater than the width of the rows Q, the width of the rows being somewhat exaggerated in the diagram for the sake of clearness. Each row P comprises a block of insulating material $p^2$ and two insulated contact-plates $p^3$ $p^4$, while each row Q comprises a block of insulating material $q^2$ and two insulated contact-plates $q^3$ and $q^4$.

The arrangement of contacts and the insulation on the drum M is such that when all of the contact-brushes are in contact with one of the rows P the current will flow from the battery M' to brush $m$, plate $p^3$, brush $n'$ to magnet I, brush $n$, plate $p^4$, brush $o'$ to battery, effecting the energizing of the magnet and the attraction to the bottom of the trough A of the magnetic sand. As the trough rotates a little farther the drum will be carried around until the brushes cross the row of insulation $p$, when the magnet will be demagnetized and the particles of black sand will be free to rise to the surface of the mercury. A slight further rotation brings all the brushes into contact with the row of contacts Q, when the direction of flow of current will be from battery M' to brush $m$, plate $q^3$, brush $n$, magnet I, brush $n'$, plate $q^4$, brush $o$, and return to battery. The contacts with the row Q are only momentary, and as the direction of flow of current through the magnet-helix is the reverse of the direction of flow when the particles of sand were attracted the polarity of the magnet will be momentarily changed and the minute magnets represented by the particles of sand will be repulsed and seek to turn themselves, as previously described, so that for the moment the sand will be partially scattered and the mercury will be free to act on the gold.

As the sand falls through the water to the surface of the mercury it becomes partly scattered, the gold, owing to its greater specific gravity, traveling more rapidly and reaching the mercury surface a little in advance of the magnetic sand, but a great proportion of the minute particles of gold is held and surrounded by the sand in such manner that it cannot escape and the mecury cannot act upon it.

As the trough in turning brings the sand to a point above the magnet I the latter attracts the sand and draws it with its contained gold down to bottom of the amalgamating-surface, each particle of sand when in the magnetic field becoming a small magnet, and each of these minute magnets seeks the other and forms a globular mass which sinks with the gold through the mercury, when the slight further rotation of the trough changes the contact and the magnet is demagnetized. The minute sand magnets are also demagnetized and are free to float away to the surface of the mercury, while the latter seizes upon and detains the gold. Just after the first action of the magnet the radial partition-plates $g'$ come into play. The mass of magnetized sand being held to the bottom of the trough would if the surface of the trough were smooth remain directly above the magnets, but the partitions $g'$ serve to forcibly remove the particles from the path of the magnet and carry them with the trough. Before leaving the magnetic field, however, the polarity of the magnet is changed, and the repulsive action of the magnet seeks to scatter the particles of sand, so that the gold is freed for the better action of the mercury thereon.

The trough continues to rotate, and as the sand which has been acted upon is traveled around out of the magnetic field it gradually rises to the top of the mercury, leaving the gold until it arrives at a point directly under the permanent or electro magnet K, at which point it is raised slightly above the surface of the mercury, so that it may more readily and thoroughly be acted upon by the suction discharge-pipe J, and any particles of sand which may have remained below the surface of the mercury will be drawn out into the body of water, leaving the bed of mercury clear of sand when it again comes under the feed-trough H.

The magnet K is surrounded by a metallic case $k$, which covers and protects it from contact with the water, the lower surface of the casing being in the form of a smooth plate arranged on a level just below the pole of the magnet and just above the mercury-level. When the black sand reaches this magnet, it is raised and clings to the bottom plate and if not removed would soon clog and fill the trough. The plates $h$ are designed to remove this accumulated sand and forcibly carry it past the magnet to the suction-trough J, the upper edges of the plates $h$ being on a line with the lower surface of the bottom plate of the casing $k$, so that they may act to remove the sand and keep the casing clear.

As the trough is rotated it is vibrated by the crank-plate $e'$, so that all of the particles of sand in the trough are kept in constant motion and the tendency to ball and clog is overcome.

In the construction illustrated in Fig. 3 the trough A is mounted on a hollow shaft B', rotated by the gears $d'$ $d^2$. Through the hollow shaft B' extends a shaft $B^2$, rotated by gears $b^2$ $b^3$ in the same direction but at greater speed than the trough A. On this shaft $B^2$ is mounted an arm R, carrying an electromagnet I, which may be energized in the same manner as previously described with reference to Fig. 1, or the contact-drum $M^2$, which governs the flow of current, may have two disk-contacts $p^5$ $q^5$, insulated from each other and from the carrying-shaft and connected by wires to the upper and lower ends of the electromagnet I. Against these disks, which are partly of insulating material, bear two contact-brushes $n^3$ $n^4$, forming the terminals of a battery-circuit, as shown, so that during the time the magnet is traversing below the lifting-magnet K and the discharge-spout its current shall be entirely shut off and the magnet be again energized just after it passes below the feed-trough H. In all other respects the action is the same, the relative speed of travel of the trough and magnet being governed by the quantity of material supplied by the trough H. It is to be noted that the described action might also be attained if the magnet I were a permanent magnet, as the effect of demagnetizing an electromagnet is gained when the trough revolves, and the partitions $g'$ carry the magnetized sand out of the magnetic field, where it is free to rise to the surface of the mercury. The same effect is produced with the revolving magnet illustrated in Fig. 3, which might also be a permanent magnet.

In Fig. 6 is illustrated the application of the invention to the riffle S of a flume T. In this construction T represents an ordinary flume provided with an amalgamating-riffle S, having a bed of mercury $x$, and I' is an electromagnet arranged below the riffle for the purpose of attracting the black sand to the bottom of the riffle. This magnet is in a circuit similar to the electric circuit previously described, so that it may be magnetized, demagnetized, and the change in its polarity effected to operate in the same manner upon the sand as described with reference to Fig. 1. At a point above the riffle is an electromagnet K', which acts to raise the particles of sand after they have been repelled by the magnet I', or the two magnets may be in circuits provided with connections by which they may be alternately energized, so that the sand will be moved back and forth and agitated in the mercury until the gold has combined with such mercury.

The manner of making and breaking circuits illustrated in Fig. 5 may be varied at pleasure, and the length of time which the magnet acts upon the sand may be varied according to circumstances and the quantity and value of the ore which is being acted upon.

In operation the change in polarity may be effected or not, as desired, as in some instances it may merely be necessary to break the magnet-circuit to demagnetize the magnet or remove the magnetized sand from the magnetic field and permit the sand to separate by gravity, and it is to be understood that these steps are within the scope of the present invention.

Having thus described my invention, what I claim, and desire to secure by Letters Patent, is—

1. The herein-described process of separating gold from magnetic ores, said process consisting in placing the ore above a bed of mercury, subjecting said ore to the influence of a magnetic field to draw said ore below the surface of the mercury, and then releasing the ore to permit the particles of ore to separate and rise through the mercury.

2. The herein-described process of separating gold from magnetic ores, said process consisting in placing the ore above a bed of mercury, drawing said ore below the surface of said bed of mercury by subjecting the ore to the action of a magnet situated below the mercury bed, and then releasing the ore to permit the same to rise through the mercury.

3. The herein-described process of separating gold from magnetic ores, said process consisting in placing the ore in water below which is a bed of mercury and permitting the ore to gradually descend through the water until the surface of the mercury is reached, then drawing said ore below the surface of said bed of mercury by subjecting it to the action of a magnet situated below the mercury bed to permit the mercury to act on the gold, and finally releasing the ore to permit the same to rise through the mercury and into the water above the same.

4. The herein-described process of separating gold from magnetic ores, said process consisting in subjecting the ore to the action of a magnet to draw the same below the surface of a bed of mercury to permit the mercury to act on the gold and then raising the exhausted ore from the mercury by subjecting it to the action of a second magnet.

5. The herein-described process of separating gold from magnetic ores, said process consisting in subjecting the ore to the action of a magnet to draw the same below the surface of a bed of mercury to permit the mercury to act on the gold releasing the ore to permit the same to rise through the mercury, and then raising the exhausted ore from the mercury by subjecting it to the action of a second magnet.

6. The herein-described process of separating gold from magnetic ores, said process consisting in placing the ore in water below which is a bed of mercury and permitting said ore to gradually descend through the water until it rests on the surface of the mercury; second, subjecting said ore to the influence of a magnet to draw the ore below the surface of the mercury to permit the mercury to act on the gold; third, releasing the ore to permit the same to rise through the mercury; fourth, raising the exhausted ore from the mercury by the action of a second magnet; and finally, removing the exhausted ore.

7. The herein-described process of separating gold from magnetic ores, said process consisting in subjecting the ore to the action of a magnet to draw the ore below the surface of a bed of mercury to permit the mercury to act on the gold and then demagnetizing said magnet to permit the ore to rise.

8. The herein-described process of separating gold from magnetic ores, said process consisting in subjecting the ore to the action of a magnet to draw the same below the surface of a bed of mercury to permit the mercury to act on the gold; second, demagnetizing said magnet; and third, subjecting the exhausted ore to the action of a second magnet to elevate the same.

9. The herein-described process of separating gold from magnetic ores, said process consisting in placing the ore in water below which is a bed of mercury and permitting said ore to gradually descend through the water until it rests on the surface of the mercury; second, subjecting said ore to the influence of a magnet to draw the ore below the surface of the mercury to permit the mercury to act on the gold; third, demagnetizing said magnet; fourth, subjecting the exhausted ore to the action of a second magnet to raise said ore from the mercury; and finally removing said exhausted ore.

10. The herein-described process of separating gold from magnetic ores, said process consisting in subjecting the ore to the action of a magnet to draw the sand below the surface of a bed of mercury to permit the mercury to act on the gold and then changing the polarity of said magnet.

11. The herein-described process of separating gold from magnetic ores, said process consisting in subjecting the ores to the action of a magnet to draw the same below the surface of a bed of mercury to permit the mercury to act on the gold, effecting a change in the polarity of said magnet, and then subjecting the exhausted ore to the action of a second magnet to elevate said ore.

12. The herein-described process of separating gold from magnetic ores, said process consisting in placing the ore in water below which is a bed of mercury and permitting said ore to gradually descend through the water until it reaches the surface of the mercury; second, subjecting said ore to the influence of a magnet to draw the ore below the surface of the mercury to permit the mercury to act on the gold; third, effecting a change in the polarity of said magnet; fourth, subjecting the exhausted ore to the action of a second magnet to elevate said exhausted ore; and finally, removing said exhausted ore.

13. The herein-described process of separating gold from black sand said process consisting in subjecting said black sand to the action of a magnet to draw the same below the surface of a bed of mercury, the grains of sand being magnetized and clinging together by magnetic force; second, changing the polarity of the said magnet and thus scattering the sand to permit the mercury to enter the spaces between the grains and amalgamate with the gold, and finally removing the exhausted sand.

14. The herein-described process of separating gold from black sand said process consisting in placing said black sand in a body of water below which is a bed of mercury and permitting the sand to gradually descend through the water until it reaches the surface of the mercury; second, subjecting the sand to the action of a magnet to draw the same below the surface of the mercury, the grains of sand being magnetized and clinging to each other by magnetic force; third, changing the polarity of the magnet, and thus changing also the polarity of the small "sand magnets" effecting a scattering of the same and permitting the mercury to enter the spaces between the grains of sand and amalgamate with the gold; fourth, subjecting the exhausted sand to the action of a second magnet to raise the same from the mercury; and finally, removing the exhausted sand.

15. The herein-described process of separating gold from magnetic ores, said process consisting first, in placing the ores on a bed of mercury; second, traveling the same through a magnetic field tending to draw the ores to the bottom of the mercury; third, passing the ore and mercury through a second magnetic field tending to raise the exhausted ore from the mercury; and finally, removing the exhausted ores.

16. The herein-described process of separating gold from magnetic ores, said process consisting in first, placing the ore in a traveling body of mercury and water, the ore gradually descending through the water until the surface of the bed of mercury is reached; traveling the mercury, water and ore through a magnetic field tending to draw the ore below the surface of the mercury to permit the mercury to act upon the gold; passing the ore and mercury and water through a second magnetic field tending to raise the exhausted ore from the mercury; and finally, removing the exhausted ore.

17. The combination of a circular amalgamating-trough, means for supporting and revolving the same, ore feeding and exhausting devices, a magnet situated under said trough, and a magnet situated above the bottom of said trough, substantially as specified.

18. The combination of a circular amalgamating-trough, means for supporting and revolving the same, ore feeding and exhausting devices, an electromagnet placed below the bottom of the trough in such position as to act upon the ore contained therein, current making and breaking devices for magnetizing and demagnetizing said magnet and a second magnet situated within said trough.

19. The combination of the circular amalgamating-trough, devices for supporting, rotating and vibrating said trough, ore feeding and exhausting devices, an electromagnet provided under the trough, and an electromagnet situated within the trough.

20. The combination of the circular trough, A, having a bottom, $a'$, of amalgamating metal, a feed-chute, an exhaust, a series of radially-arranged partitions, $g'$, in the bottom of said trough, scraping-bars, $h$, an electromagnet, I, below the trough, a contact-drum, M, a series of brushes in contact therewith, a source of electricity, M', current-conducting wires between the source of electricity, the contact-drum and the magnet, a second magnet, K, within the trough and a casing, $k$, surrounding said magnet, K, substantially as specified.

21. The combination of the circular amalgamating-trough, devices for supporting and rotating the same, an electromagnet, I, placed beneath the trough, an electromagnet, K, provided in the trough, and a series of vertical partitions dividing the bottom of the trough into a series of pockets.

22. The combination of the circular amalgamating-trough, devices for supporting and rotating the same, an electromagnet, I, placed beneath the trough, an electromagnet, K, provided in the trough, a sliding step-bearing for the trough-supporting shaft, a crank-disk, and a rod connecting said crank-disk to the step-bearing, substantially as specified.

23 The combination of the circular trough, a vertical shaft carrying the same, devices for feeding and exhausting the ore, an electromagnet within the trough, an electromagnet, I, under said trough, a contact-drum formed of alternately-arranged contact-plates and insulating material, mounted on said shaft, stationary contact-brushes in contact with said drum, an electric battery, and connecting-wires extending between the brushes, the battery and the magnet, I, substantially as specified.

24. The combination of the circular amalgamating-trough, devices for supporting and rotating the same, an electromagnet placed beneath the trough and adapted to act on the ore contained therein, a magnet, as K, within the trough, a casing, $k$, surrounding said magnet and blades carried by the trough and adapted to remove from the lower surface of the casing any accumulated ore which may be attracted by the magnet.

25. The combination of the circular amalgamating-trough, devices for supporting and rotating the same, an electromagnet provided beneath said trough, and a source of electrical supply, a current making and breaking drum carried by or rotating with the trough and current-conducting wires leading from the battery and the magnet to brushes or contact-plates adapted to make contact with said drum.

26. The combination of the circular amalgamating-trough, mechanism for supporting and rotating the same, a stationary overflow-trough, an overflow-pipe leading from the amalgamating-trough to a point above the overflow-trough, an electromagnet below the amalgamating-trough and an electromagnet in said amalgamating-trough.

In witness whereof I have hereunto set my hand this 9th day of September, A. D. 1896.

CHARLES F. PIKE.

Witnesses:
EMMA PIKE,
WM. A. PIKE.